US010379318B2

(12) United States Patent
Matsunaga

(10) Patent No.: US 10,379,318 B2
(45) Date of Patent: Aug. 13, 2019

(54) IMAGE-CAPTURING DEVICE, PROPOSAL-IMAGE GENERATING DEVICE, PROPOSAL-IMAGE GENERATING METHOD, PROPOSAL-IMAGE GENERATING PROGRAM, AND STORAGE MEDIUM

(71) Applicant: OLYMPUS CORPORATION, Hachioji-shi, Tokyo (JP)

(72) Inventor: Maki Matsunaga, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/936,371

(22) Filed: Mar. 26, 2018

(65) Prior Publication Data

US 2018/0217356 A1 Aug. 2, 2018

Related U.S. Application Data

(63) Continuation of application No. PCT/JP2015/078037, filed on Oct. 2, 2015.

(51) Int. Cl.
*H04N 5/232* (2006.01)
*G02B 7/28* (2006.01)
(Continued)

(52) U.S. Cl.
CPC .............. *G02B 7/28* (2013.01); *G03B 13/30* (2013.01); *G03B 13/32* (2013.01); *G03B 13/36* (2013.01); *G03B 15/00* (2013.01); *H04N 5/232* (2013.01)

(58) Field of Classification Search
CPC .......... G02B 7/28; G03B 13/36; G03B 13/30; G03B 13/32; G03B 15/00; H04N 5/232
See application file for complete search history.

(56) References Cited

U.S. PATENT DOCUMENTS 7,868,922 B2 * 1/2011 Ciuc ...................... G06T 7/194
348/222.1

FOREIGN PATENT DOCUMENTS

JP 2002142148 A 5/2002
JP 2003283902 A 10/2003
(Continued)

OTHER PUBLICATIONS

International Search Report (ISR) dated Jan. 12, 2016 issued in International Application No. PCT/JP2015/078037.
(Continued)

*Primary Examiner* — Twyler L Haskins
*Assistant Examiner* — Angel L Garces-Rivera
(74) *Attorney, Agent, or Firm* — Holtz, Holtz & Volek PC

(57) ABSTRACT

Provided is an image-capturing device including: an image-capturing unit that acquires an image of a subject; a subject-extracting unit that separates and extracts a main subject and a background from the acquired image; a distance-information acquiring unit that calculates the distance between the image-capturing unit and the extracted main subject and the distance between the image-capturing unit and the extracted background; a photographing-condition acquiring unit that acquires acquisition-time photographing conditions for an acquisition time of the image and an adjustable photographing condition that can be adjusted with respect to the acquisition-time photographing conditions; a photographing-condition selecting unit that selects a photographing condition that is worth adjusting on the basis of the acquired acquisition-time photographing conditions and adjustable photographing condition and the acquired distances; and an image-processing unit that generates, by performing image processing on the acquired image, an image that will be acquired when the selected photographing condition is set.

10 Claims, 8 Drawing Sheets

(51) Int. Cl.
*G03B 15/00* (2006.01)
*G03B 13/32* (2006.01)
*G03B 13/30* (2006.01)
*G03B 13/36* (2006.01)

(56) References Cited

FOREIGN PATENT DOCUMENTS

| | | | |
|---|---|---|---|
| JP | 2004333924 | A | 11/2004 |
| JP | 2008205958 | A | 9/2008 |
| JP | 4935302 | B2 | 5/2012 |
| JP | 2013058861 | A | 3/2013 |
| JP | 2014131187 | A | 7/2014 |
| JP | 2015041865 | A | 3/2015 |

OTHER PUBLICATIONS

Written Opinion dated Jan. 12, 2016 issued in International Application No. PCT/JP2015/078037.

* cited by examiner

IMAGE-CAPTURING DEVICE, PROPOSAL-IMAGE GENERATING DEVICE, PROPOSAL-IMAGE GENERATING METHOD, PROPOSAL-IMAGE GENERATING PROGRAM, AND STORAGE MEDIUM

CROSS-REFERENCE TO RELATED APPLICATIONS

This is a continuation of International Application PCT/JP2015/078037, with an international filing date of Oct. 2, 2015, which is hereby incorporated by reference herein in its entirety.

TECHNICAL FIELD

The present invention relates to an image-capturing device, a proposal-image generating device, a proposal-image generating method, a proposal-image generating program, and a storage medium.

BACKGROUND ART

A bracket photography function, such as AE bracketing or AF bracketing, is known in which a plurality of images are acquired with one photographing instruction while changing a photographing condition (for example, refer to PTL 1).

A bracket photography function allows a plurality of images to be acquired while changing any one photographing condition such as exposure or focal length in a state where the other photographing conditions are fixed, and therefore a more desirable image acquired using a more appropriate exposure or focal length can be included in a group of acquired photographs.

CITATION LIST

Patent Literature

{PTL 1} Japanese Unexamined Patent Application Publication No. 2004-333924

SUMMARY OF INVENTION

An aspect of the present invention provides an image-capturing device that includes:
- an image-capturing unit that acquires an image of a subject;
- a subject-extracting unit that separates and extracts a main subject and a background from the image acquired by the image-capturing unit;
- a distance-information acquiring unit that calculates a distance between the image-capturing unit and the main subject extracted by the subject-extracting unit and a distance between the image-capturing unit and the background extracted by the subject-extracting unit;
- a photographing-condition acquiring unit that acquires acquisition-time photographing conditions for an acquisition time of the image and an adjustable photographing condition that can be adjusted with respect to the acquisition-time photographing conditions;
- a photographing-condition selecting unit that selects a photographing condition that is worth adjusting on the basis of the acquisition-time photographing conditions and the adjustable photographing condition acquired by the photographing-condition acquiring unit and the distances acquired by the distance-information acquiring unit; and
- an image-processing unit that generates, by performing image processing on the image acquired by the image-capturing unit, an image that will be acquired when the photographing condition selected by the photographing-condition selecting unit is set.

Another aspect of the present invention provides an proposal-image generating device that includes:
- a subject-extracting unit that separates and extracts a main subject and a background from an image acquired by an image-capturing unit;
- a distance-information acquiring unit that calculates a distance between the image-capturing unit and the main subject extracted by the subject-extracting unit and a distance between the image-capturing unit and the background extracted by the subject-extracting unit;
- a photographing-condition acquiring unit that acquires acquisition-time photographing conditions for an acquisition time of the image and an adjustable photographing condition that can be adjusted with respect to the acquisition-time photographing conditions;
- a photographing-condition selecting unit that selects a photographing condition that is worth adjusting on the basis of the acquisition-time photographing conditions and the adjustable photographing condition acquired by the photographing-condition acquiring unit and the distances acquired by the distance-information acquiring unit; and
- an image-processing unit that generates, by performing image processing on the image acquired by the image-capturing unit, an image that will be acquired when the photographing condition selected by the photographing-condition selecting unit is set.

In addition, another aspect of the present invention provides a proposal-image generating method that includes:
- a subject-extracting step of separating and extracting a main subject and a background from an image acquired by an image-capturing unit;
- a distance-information acquiring step of calculating a distance between the image-capturing unit and the main subject extracted in the subject-extracting step and a distance between the image-capturing unit and the background extracted in the subject-extracting step;
- a photographing-condition acquiring step of acquiring acquisition-time photographing conditions for an acquisition time of the image and an adjustable photographing condition that can be adjusted with respect to the acquisition-time photographing conditions;
- a photographing-condition selecting step of selecting a photographing condition that is worth adjusting on the basis of the acquisition-time photographing conditions and the adjustable photographing condition acquired in the photographing-condition acquiring step and the distances acquired in the distance-information acquiring step; and
- an image-processing step of generating, by performing image processing on the image acquired by the image-capturing unit, an image that will be acquired when the photographing condition selected in the photographing-condition selecting step is set.

In addition, another aspect of the present invention provides a proposal-image generating program that causes a computer to execute:

a subject-extracting step of separating and extracting a main subject and a background from an image acquired by an image-capturing unit;

a distance-information acquiring step of calculating a distance between the image-capturing unit and the main subject extracted in the subject-extracting step and a distance between the image-capturing unit and the background extracted in the subject-extracting step;

a photographing-condition acquiring step of acquiring acquisition-time photographing conditions for an acquisition time of the image and an adjustable photographing condition that can be adjusted with respect to the acquisition-time photographing conditions;

a photographing-condition selecting step of selecting a photographing condition that is worth adjusting on the basis of the acquisition-time photographing conditions and the adjustable photographing condition acquired in the photographing-condition acquiring step and the distances acquired in the distance-information acquiring step; and an image-processing step of generating, by performing image processing on the image acquired by the image-capturing unit, an image that will be acquired when the photographing condition selected in the photographing-condition selecting step is set.

In addition, another aspect of the present invention provides a non-temporary computer-readable storage medium that stores a proposal-image generating program that causes a computer to execute:

a subject-extracting step of separating and extracting a main subject and a background from an image acquired by an image-capturing unit;

a distance-information acquiring step of calculating a distance between the image-capturing unit and the main subject extracted in the subject-extracting step and a distance between the image-capturing unit and the background extracted in the subject-extracting step;

a photographing-condition acquiring step of acquiring acquisition-time photographing conditions for an acquisition time of the image and an adjustable photographing condition that can be adjusted with respect to the acquisition-time photographing conditions;

a photographing-condition selecting step of selecting a photographing condition that is worth adjusting on the basis of the acquisition-time photographing conditions and the adjustable photographing condition acquired in the photographing-condition acquiring step and the distances acquired in the distance-information acquiring step; and an image-processing step of generating, by performing image processing on the image acquired by the image-capturing unit, an image that will be acquired when the photographing condition selected in the photographing-condition selecting step is set.

DESCRIPTION OF EMBODIMENTS

Figure 1:
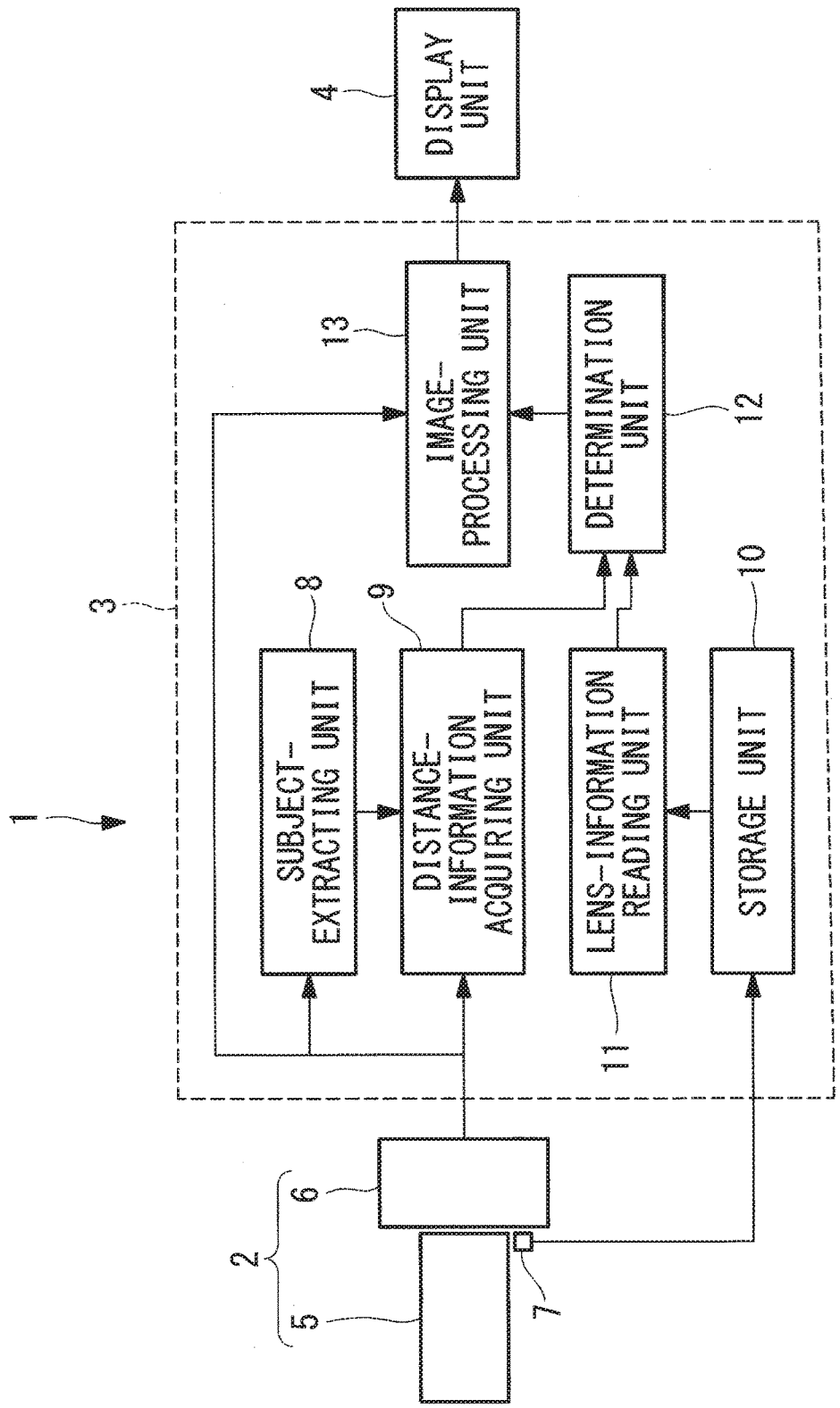
FIG. 1 is a block diagram illustrating an image-capturing device according to an embodiment of the present invention.

Hereafter, an image-capturing device 1 according to an embodiment of the present invention will be described while referring to the drawings.

As illustrated in FIG. 1, the image-capturing device 1 according to this embodiment includes an image-capturing unit 2 that acquires an image by photographing a subject, a proposal-image generating unit (proposal-image generating device) 3 that generates a proposal image by performing processing on the image acquired by the image-capturing unit 2, and a display unit 4 that displays the generated proposal image.

The image-capturing unit 2 includes an exchangeable lens 5 and an image-capturing element 6 that captures light from the subject that has been collected by the lens 5. In addition, the image-capturing unit 2 includes a lens-information acquiring unit 7 that reads information regarding the attached lens 5.

The lens-information acquiring unit 7 is a reader that reads the storage of an information storage unit such as an IC or a barcode, which is not illustrated, that is included with the lens 5. Examples of the information regarding the lens 5 include the adjustable range of the F-number and the value of an image-acquisition time, the range of the focal length and the value of an image-acquisition time, and so forth.

Information regarding the lens 5 other than the value of the image-acquisition time may be individually read from the lens 5. Identification information may be read from the lens 5, and information regarding the lens 5 stored in a memory, which is not illustrated, may be read out as identification information.

Furthermore, in this embodiment, the image-capturing unit 2 acquires a plurality of images having different focus positions in response to one photographing instruction.

The proposal-image generating unit 3 according to an embodiment of the present invention includes a subject-extracting unit 8 that extracts a main subject and a background by performing processing on any of the images that have been acquired by the image-capturing unit 2, a distance-information acquiring unit 9 that calculates the distances between the extracted main subject and background and the image-capturing unit 2, a storage unit 10 that stores information regarding the lens 5 acquired by the lens-information acquiring unit 7, a lens-information reading unit (photographing-condition acquiring unit) 11 that reads out information regarding the lens 5 from the storage unit 10, a determination unit (photographing-condition selecting unit) 12 that selects a photographing condition that is worth adjusting on the basis of the read-out information regarding the lens 5 and the calculated distance information, and an image-processing unit 13 that performs processing on an image acquired by the image-capturing unit 2 on the basis of the selected photographing condition.

The subject-extracting unit 8, the distance-information acquiring unit 9, the storage unit 10, the lens-information reading unit 11, the determination unit 12, and the image-processing unit 13 are composed of circuits. The display unit 4 is a monitor.

Extraction of the main subject and background by the subject-extracting unit 8 and calculation of the distance by the distance-information acquiring unit 9 are implemented using known methods.

The determination unit 12 first determines whether the F-number, the focal length, and the zoom magnification are photographing conditions that can be adjusted on the basis of the information regarding the lens 5 acquired by the lens-information acquiring unit 7.

Figure 3:
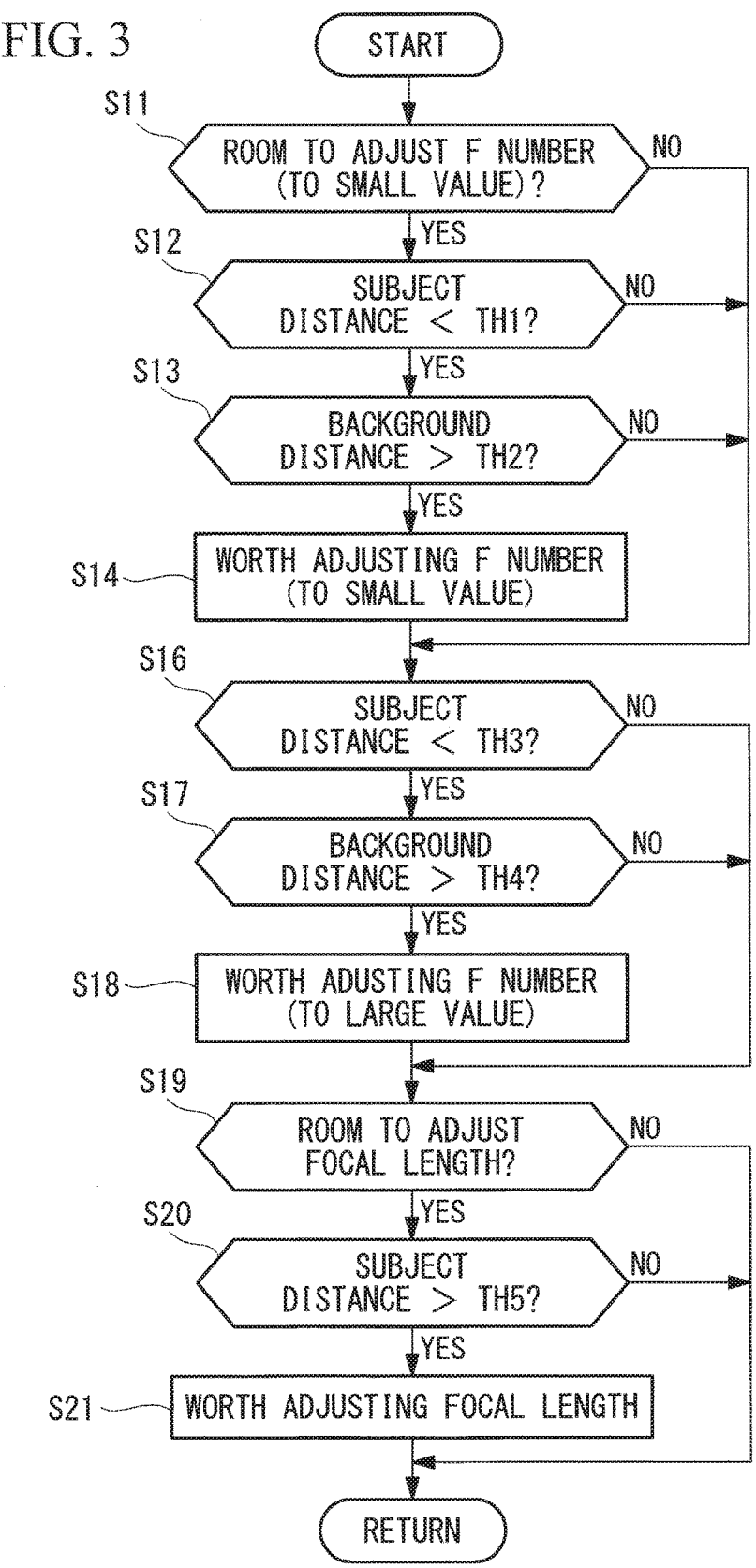
FIG. 3 is a flowchart illustrating a photographing-condition selection step of the proposal-image generating method in FIG. 2.

In other words, as illustrated in FIG. 3, the determination unit 12 determines whether there is room to adjust the F-number on the basis of where the value of the F-number, at the acquisition time of the image, of the lens 5, which was read out as the information regarding the lens 5, is located within the adjustable range. In the case where there is no room for adjustment, the F-number is determined to be a photographing condition that is not worth adjusting.

In addition, in the case where there is room to adjust the F-number so as to be small (step S11), a determination is made as to whether the F-number is a "photographing condition that is worth adjusting" on the basis of the calculated distance information. Specifically, in the case where the distance from the image-capturing unit 2 to the main subject is smaller than a first threshold TH1 (step S12) and the distance from the image-capturing unit 2 to the background is larger than a second threshold TH2 (>TH1) (step S13), it is determined that the F-number is a "photographing condition that is worth adjusting" so as to be small (step S14). In the case where the main subject is far away and the background is also far away, a significant effect would not be obtained even if the F-number were adjusted so as to be small, and therefore, in this case, it is determined that the F-number is a "photographing condition that is not worth adjusting" so as to be small.

In other words, in the case where the main subject is close and the main subject and the background are separated from each other, an effect of blurring the background can be sufficiently obtained, and therefore the F-number is determined to be a "photographing condition that is worth adjusting" so as to be small in this case.

In addition, it is determined whether the F-number is a "photographing condition that is worth adjusting" so as to be large. Specifically, in the case where the distance from the image-capturing unit 2 to the main subject is smaller than a third threshold TH3 (step S16) and the distance from the image-capturing unit 2 to the background is larger than a large fourth threshold TH4 (>TH3) (step S17), it is determined that the F-number is a "photographing condition that is worth adjusting" so as to be large (step S18). In the case where the main subject is far away and the background is also far away, a significant effect would not be obtained even if the F-number were adjusted so as to be large, and therefore it is determined that the F-number is a "photographing condition that is not worth adjusting" so as to be large in this case.

In other words, in the case where the main subject is close and the main subject and the background are separated from each other, an effect of increasing the depth of field can be sufficiently obtained, and therefore it is determined that the F-number is a "photographing condition that is worth adjusting" so as to be large in this case.

In the case where there is room to adjust the focal length of the lens 5 (step S19), it is determined whether the focal length is a "photographing condition that is worth adjusting" on the basis of the calculated distance information. Specifically, in the case where the distance from the image-capturing unit 2 to the main subject is larger than a fifth threshold TH5 (step S20), it is determined that the focal length is a "photographing condition that is worth adjusting" (step S21). In the case where the main subject is close, a significant effect would not be obtained even if the focal length were adjusted, and therefore it is determined that the focal length is a "photographing condition that is not worth adjusting" in this case.

In other words, in the case where the main subject is far away, an effect of adjusting the ratio between the background and the subject can be sufficiently obtained, and therefore it is determined that the focal length is a "photographing condition that is worth adjusting" in this case.

Figure 4:
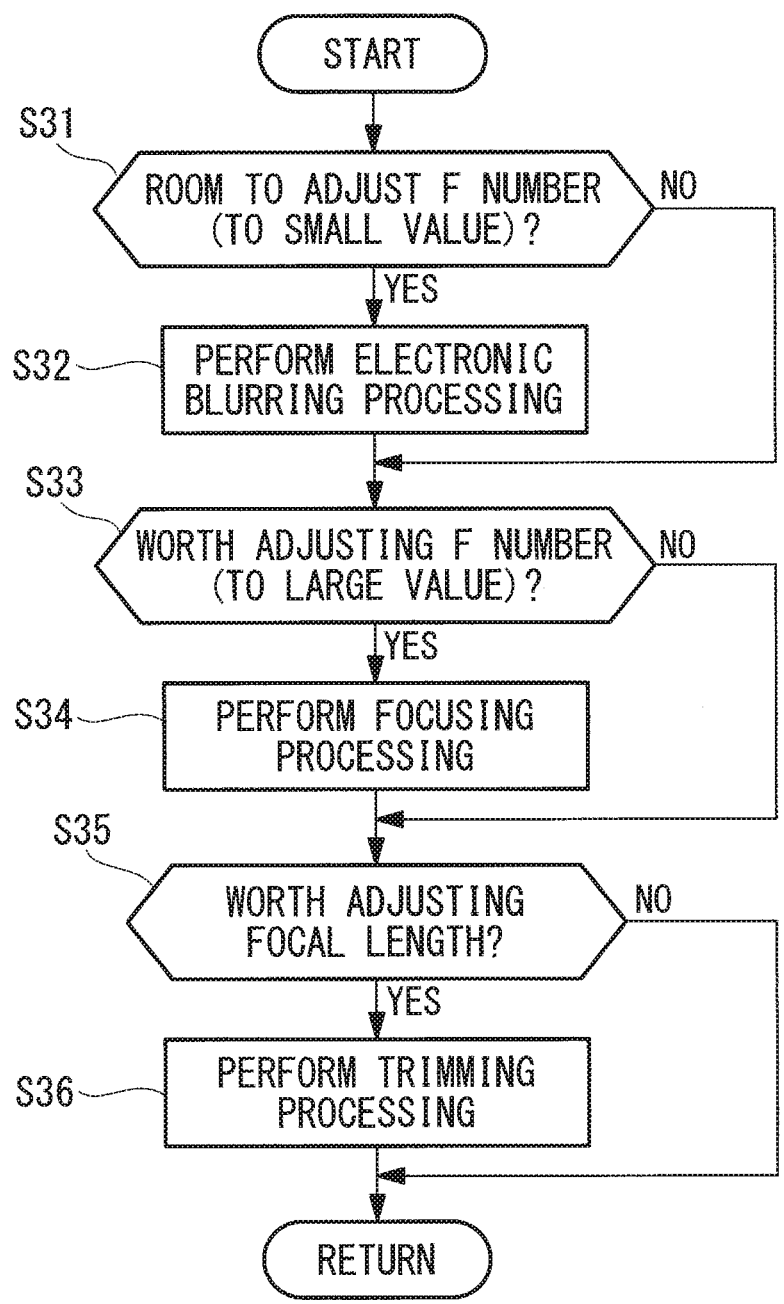
FIG. 4 is a flowchart illustrating an image-processing step of the proposal-image generating method in FIG. 2.

As illustrated in FIG. 4, in the case where it is determined by the determination unit 12 that the F-number is a "photographing condition that is worth adjusting" so as to be small (step S31), the image-processing unit 13 generates a proposal image that may be acquired if the F-number is adjusted so as to be small by performing electronic blurring processing on any of the images that have been acquired by the image-capturing unit 2 (step S32).

In addition, in the case where it is determined by the determination unit 12 that the F-number is a "photographing condition that is worth adjusting" so as to be large (step S33), the image-processing unit 13 generates proposal images that may be acquired if the F-number is adjusted so as to be large by performing focus processing on a plurality of images that have been acquired by the image-capturing unit 2 (step S34).

In addition, in the case where it is determined that the focal length is a "photographing condition that is worth adjusting" by the determination unit 12 (step S35), the image-processing unit 13 generates proposal images that may be acquired if the focal length is adjusted by performing trimming processing on a plurality of images acquired by the image-capturing unit 2 (step S36).

Next, a proposal-image generating method in which the thus-configured image-capturing device 1 and proposal-image generating device 3 according to this embodiment are used will be described.

Figure 2:
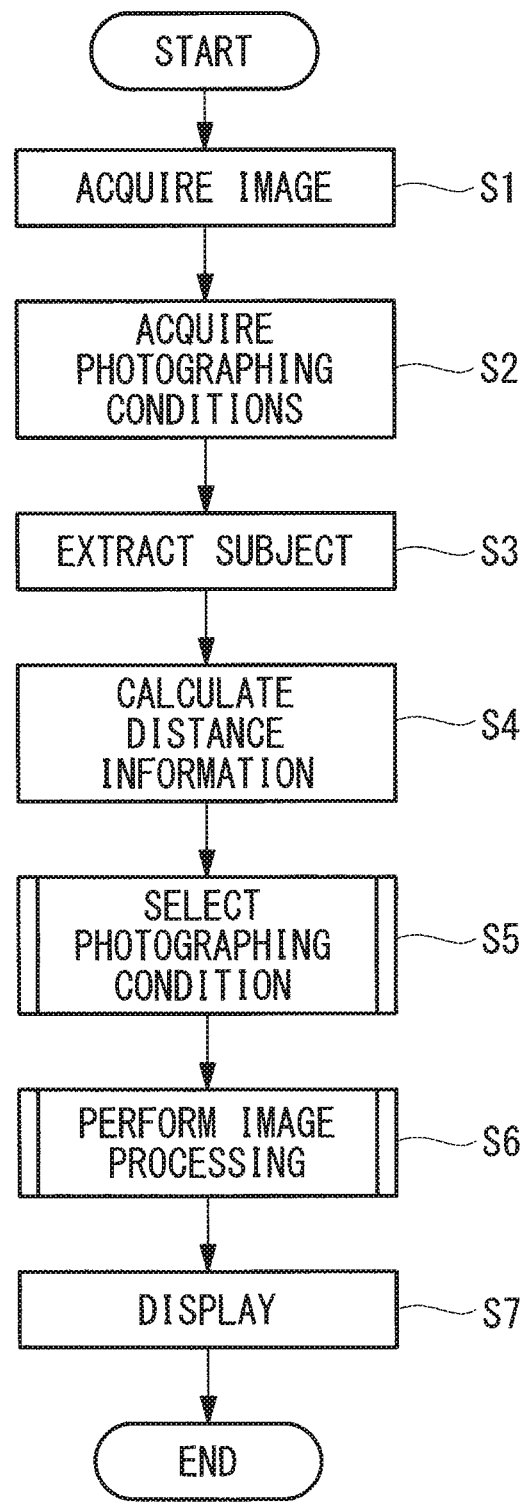
FIG. 2 is a flowchart illustrating a proposal-image generating method in which the image-capturing device in FIG. 1 is used.

As illustrated in FIG. 2, when a suitable lens 5 selected by the user is attached and a photographing instruction is input, light from the subject is collected by the lens 5 and captured by the image-capturing element 6, and as a result a plurality of images, which have been made to have different focus positions from each other, are acquired (image-acquiring step S1). Then, the information regarding the lens 5 at the time when the images were acquired (acquisition-time photographing conditions) and the F-number and the range of focal length (adjustable photographing conditions) are acquired by the lens-information acquiring unit 7 (photographing-conditions acquiring step S2). The adjustable photographing conditions may be acquired at the time when the lens 5 is attached.

The acquired images are sent to the proposal-image generating unit 3 according to this embodiment and stored in the storage unit 10. The main subject and background are extracted in the subject-extracting unit 8 (subject-extracting step S3), and the distance from the image-capturing unit 2 to the main subject and the distance from the image-capturing unit 2 to the background are calculated by the distance-information acquiring unit 9 (distance-information acquiring step S4).

Then, in the determination unit 12, first, it is determined whether the photographing conditions consisting of the F-number and the focal length are photographing conditions that have room for adjustment, and next, in the case where it is determined that there is room for adjustment, it is determined whether the photographing conditions are photographing conditions that are worth adjusting on the basis of the calculated distances (photographing-condition selecting step S5).

In the case where it is determined that the F-number is a "photographing condition that is worth adjusting" so as to be small, electronic blurring processing is performed in the image-processing unit 13 (image-processing step S6) on any of the images acquired by the image-capturing unit 2, and a proposal image is generated.

In the case where it is determined that the F-number is a "photographing condition that is worth adjusting" so as to be large, focus processing is performed in the image-processing unit 13 (image-processing step S6) on a plurality of images acquired by the image-capturing unit 2, and proposal images are generated.

In addition, in the case where it is determined that the focal length is a "photographing condition that is worth adjusting", trimming processing is performed in the image-processing unit 13 (image-processing step S6) on any of the images acquired by the image-capturing unit 2, and a proposal image is generated.

Depending on the photographing condition and the room for adjustment in the photographing condition, not just one proposal image but rather a plurality of proposal images may be generated by varying the condition.

Then, the proposal image generated in the image-processing unit 13 is transmitted to the display unit 4 and displayed (display step S7). An adjustment value of the photographing condition that would be necessary in order to acquire the proposal image is displayed as text together with the proposal image on the display unit 4.

With the thus-configured image-capturing device 1, proposal-image generating device 3, and proposal-image generating method according to this embodiment, there is an advantage in that, when it is determined that a photographing condition is a photographing condition that is worth adjusting, a proposal image that may be acquired if that photographing condition is set is generated and presented, and therefore the user is made aware that an image like the generated image could be acquired if that photographing condition is set.

In other words, in this embodiment, the user can be informed that it is possible to acquire an image like the generated image by setting the photographing condition while leaving the lens 5 attached at the acquisition time of the image as is and without exchanging the lens. In particular, there is an advantage in that a user who is inexperienced in photography can be informed of the range of expression that is available by changing a photographing condition and the choices available when the user sets the photographing condition the next time a photograph is taken can be extended.

Although a proposal image obtained by changing a photographing condition without exchanging the lens 5 attached at the acquisition time of the image is presented in this embodiment, alternatively, a proposal image that could be acquired after exchanging the lens 5 may be generated and presented.

For example, information regarding a lens 5 owned by the user, information regarding a lens 5 that may be attached by the user, or information regarding a lens 5 that is not owned by the user but could be acquired or exchanged by the user may be stored in the storage unit 10, and such information regarding lenses 5 may be included when acquiring photographing conditions that can be adjusted.

Figure 5:
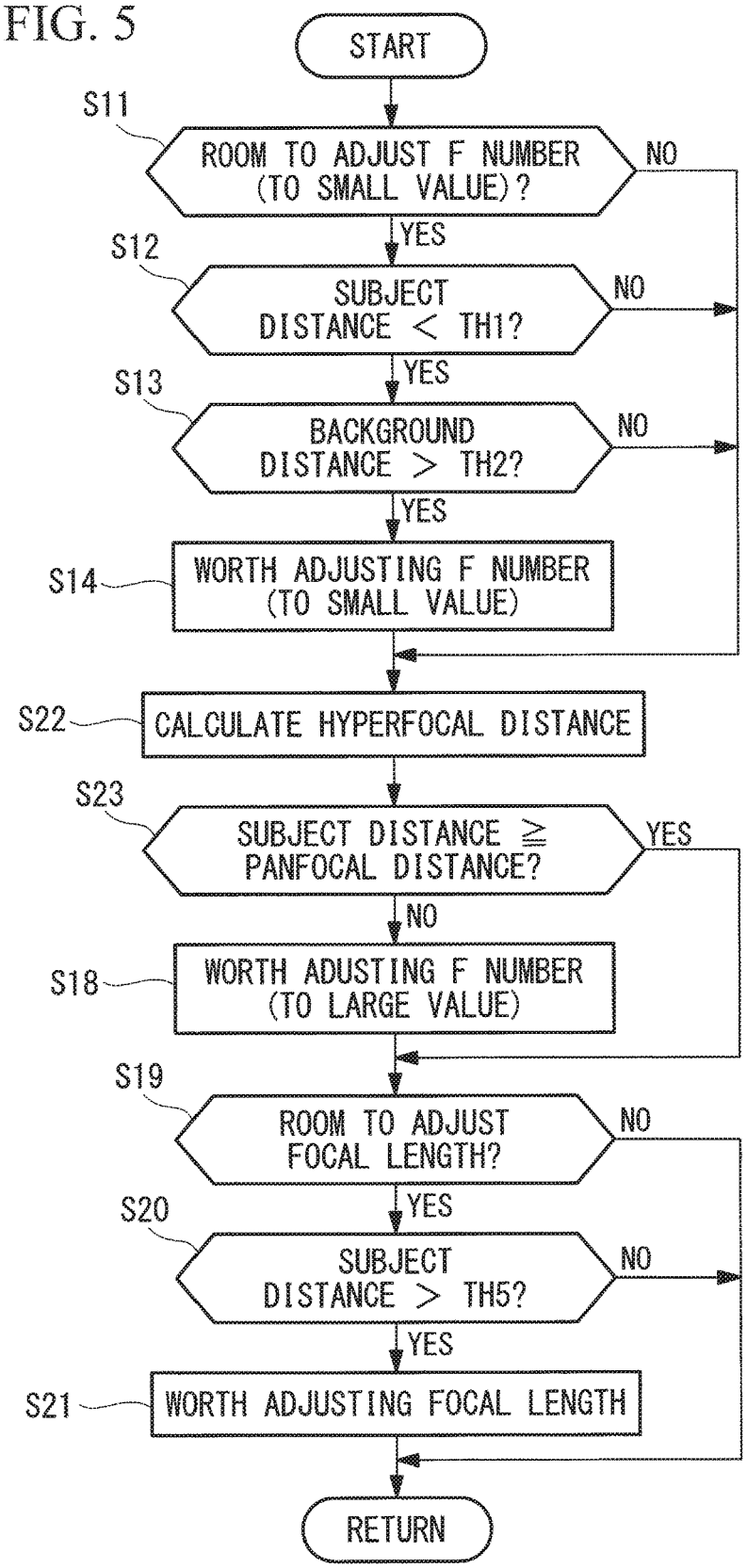
FIG. 5 is a flowchart illustrating a modification of the proposal-image generating method in FIG. 2.

In addition, although a determination is made on the basis of the distance from the image-capturing unit 2 to the main subject and the distance from the image-capturing unit 2 to the background when determining whether to adjust the F-number so as to be large, the determination may alternatively be made on the basis of whether pan focus is set as illustrated in FIG. 5 (steps S22 and S23). Pan focus can be calculated by obtaining a hyperfocal distance using the following expression.

$$\text{hyperfocal distance} = \text{focal length} \times \text{focal length} \div \text{aperture value} \div \text{permissible circle of confusion}$$

In the case where the distance to the main subject is larger than the calculated hyperfocal distance, that is, in the case where $$\text{subject distance} \geq \text{hyperfocal distance}$$

it is determined that pan focus exists, and a determination can be made that the F-number is a "photographing condition that is not worth adjusting" so as to be large since focusing is realized over the entire range from a short distance to a long distance in this case.

Figure 6:
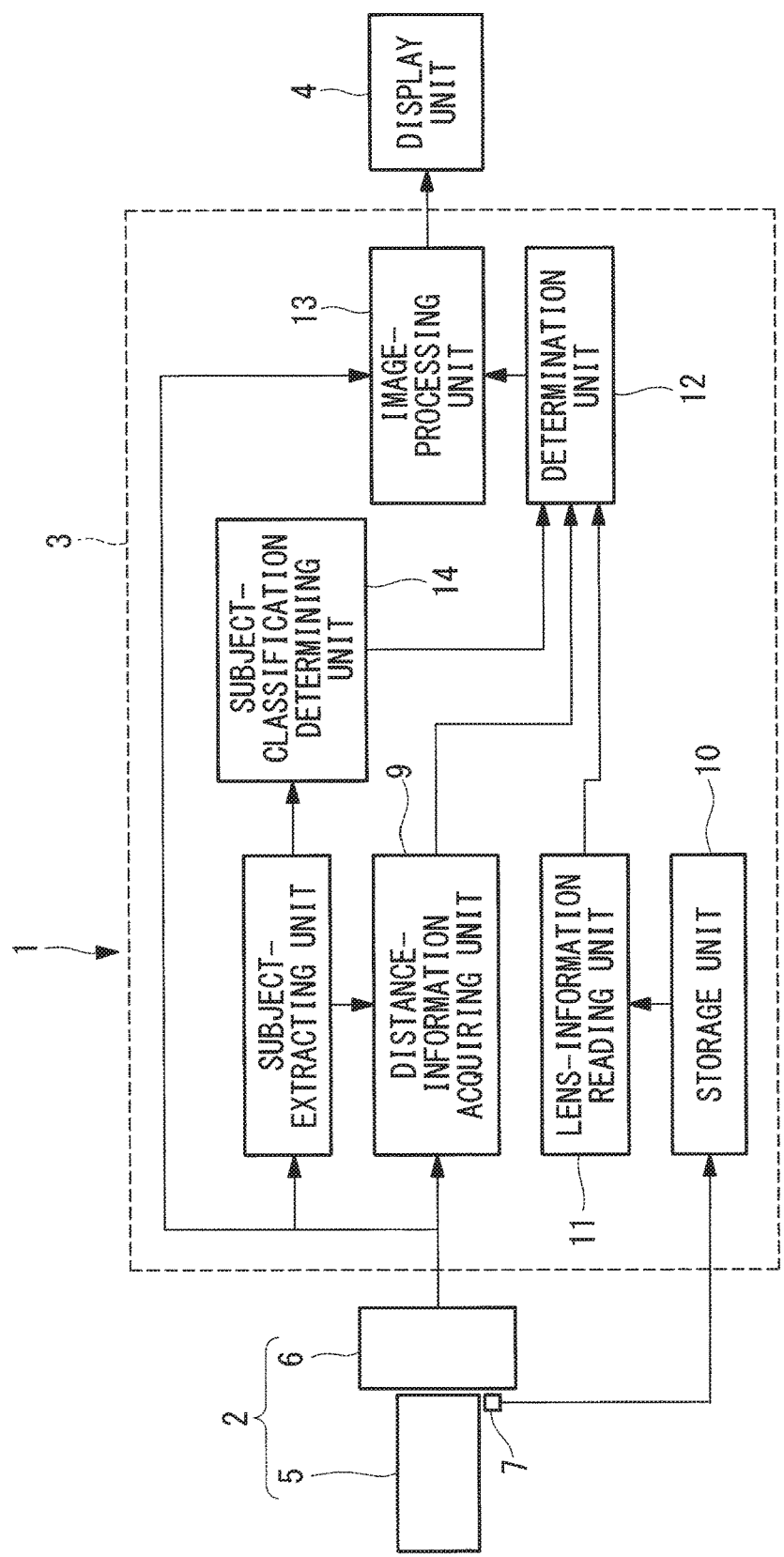
FIG. 6 is a block diagram illustrating a modification of the image-capturing device in FIG. 1.
Figure 7:
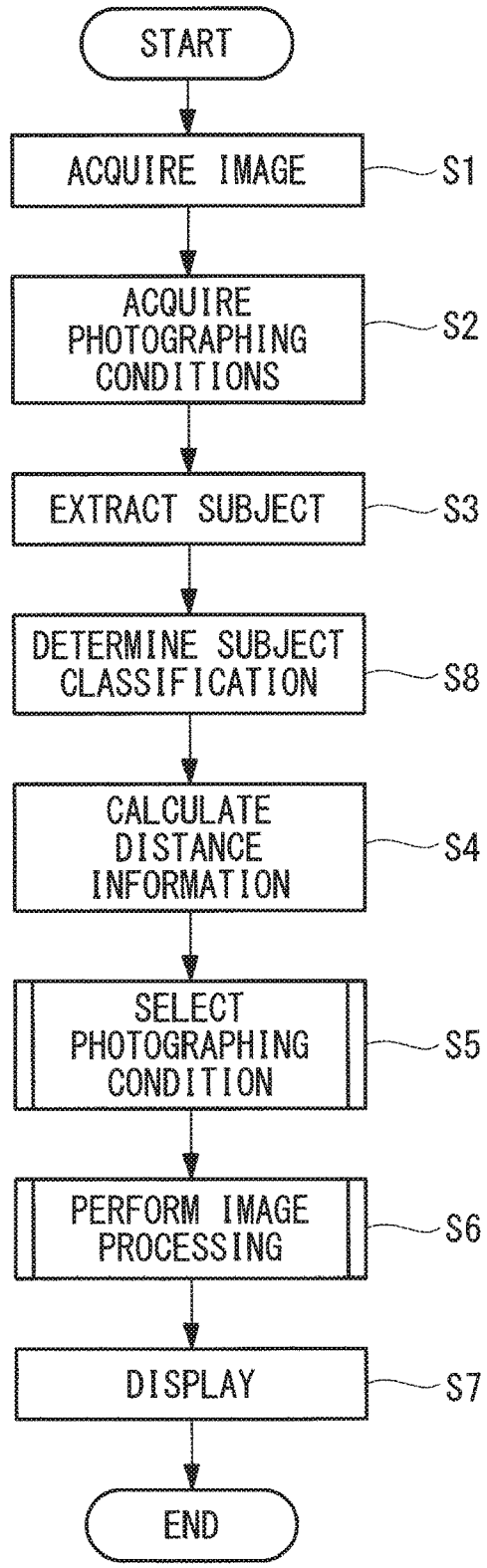
FIG. 7 is a flowchart illustrating a proposal-image generating method in which the image-capturing device in FIG. 6 is used.
Figure 8:
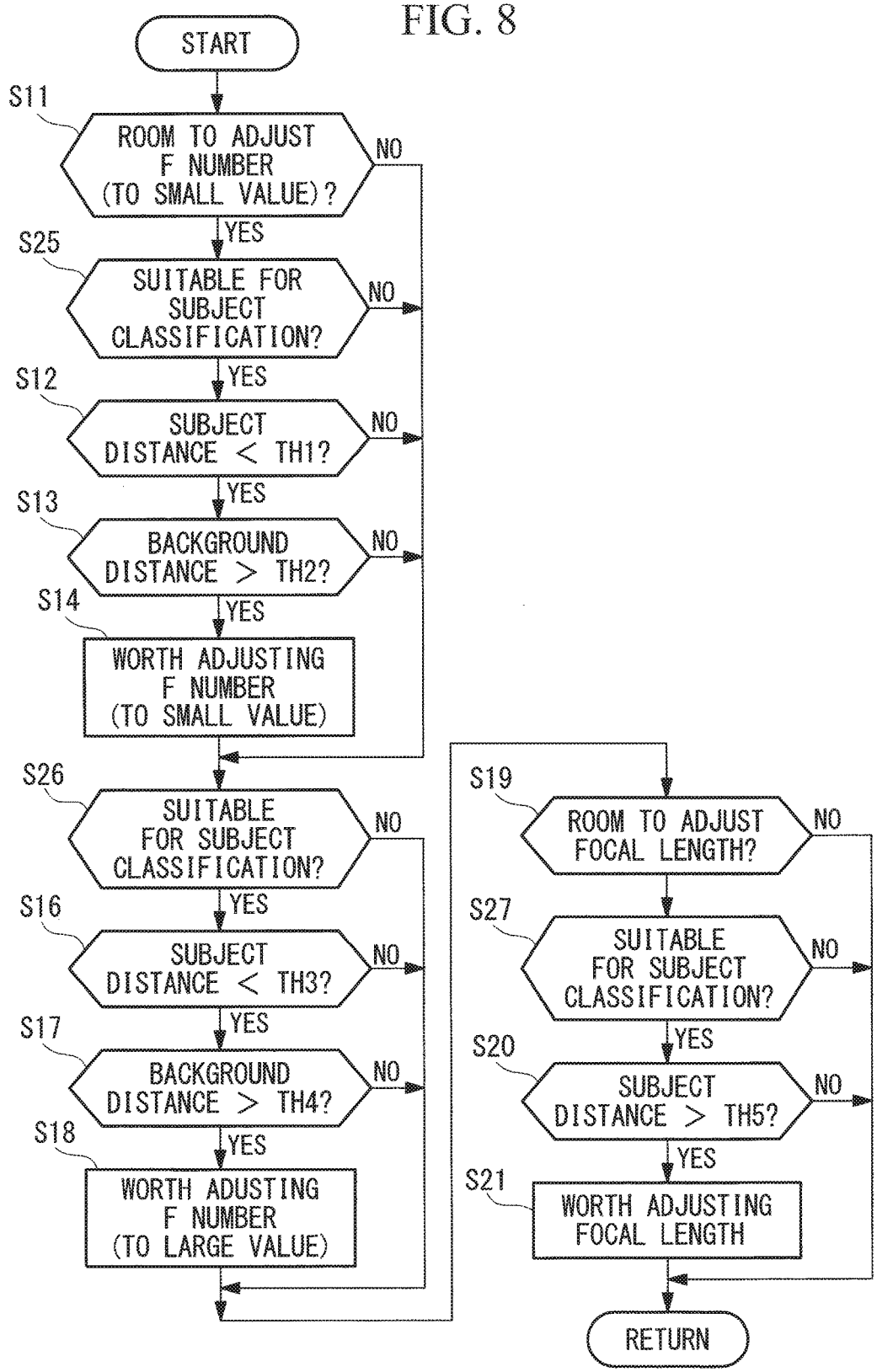
FIG. 8 is a flowchart illustrating a photographing-condition selection step of the proposal-image generating method in FIG. 7.

Furthermore, in this embodiment, as illustrated in FIG. 6, a subject-classification determining unit 14 may be included that determines a classification of the main subject extracted by the subject-extracting unit 8, and as illustrated in FIGS. 7 and 8, the determination unit 12 may determine whether a photographing condition is a "photographing condition that is worth adjusting" in accordance with a determination result of the classification of the main subject (steps S8, S25, S26, and S27).

For example, in the case of a subject that is appropriate for blurring processing using macro-photography such as a flower or an insect, it is sufficient to determine that the F-number is a "photographing condition that is worth adjusting" so as to be small.

In addition, in the case of a subject that is not suitable for blurring processing such as a landscape, it is sufficient to determine that the F-number is not a "photographing condition that is worth adjusting" so as to be small.

Furthermore, although the distance to the main subject and the distance to the background are calculated from the image acquired by the image-capturing unit 2 in this embodiment, a sensor (not illustrated) may alternatively be included that measures the respective distances.

In addition, although a case is described in this embodiment in which the image-capturing unit 2 obtains a plurality of images that have had their focus positions made different from each other, the image-capturing unit 2 may instead obtain a single image in the case where focus processing is not going to be performed.

Furthermore, in addition to being implemented by the proposal-image generating device 3 composed of the above-described circuits, the proposal-image generating method according to this embodiment may also be implemented by a proposal-image generating program that can be executed by a computer. In this case, the proposal-image generating method according to this embodiment is implemented by executing the proposal-image generating program using a processor such as a CPU.

Specifically, a proposal-image generating program stored on a storage medium is read out and the read out proposal-image generating program is executed by a processor such as a CPU. In this case, the storage medium is an object that stores programs, data, and the like, and the function thereof can be implemented using an optical disc (DVD, CD, etc.), a hard disk drive or a memory (card memory, ROM, etc.).

As a result, the above-described embodiment leads to the following aspects.

An aspect of the present invention provides an image-capturing device that includes:
- an image-capturing unit that acquires an image of a subject;
- a subject-extracting unit that separates and extracts a main subject and a background from the image acquired by the image-capturing unit;
- a distance-information acquiring unit that calculates a distance between the image-capturing unit and the main subject extracted by the subject-extracting unit and a distance between the image-capturing unit and the background extracted by the subject-extracting unit;
- a photographing-condition acquiring unit that acquires acquisition-time photographing conditions for an acquisition time of the image and an adjustable photographing condition that can be adjusted with respect to the acquisition-time photographing conditions;
- a photographing-condition selecting unit that selects a photographing condition that is worth adjusting on the basis of the acquisition-time photographing conditions and the adjustable photographing condition acquired by the photographing-condition acquiring unit and the distances acquired by the distance-information acquiring unit; and
- an image-processing unit that generates, by performing image processing on the image acquired by the image-capturing unit, an image that will be acquired when the photographing condition selected by the photographing-condition selecting unit is set.

According to this aspect, when an image of a subject is acquired by the image-capturing unit, a main subject and a background of the image are separated and extracted by the subject-extracting unit, and a distance between the image-capturing unit and the main subject and a distance between the image-capturing unit and the background are calculated by the distance-information acquiring unit. In addition, acquisition-time photographing conditions for the acquisition time of the image and an adjustable photographing condition that can be adjusted with respect to the acquisition-time photographing conditions are acquired by the photographing-condition acquiring unit. In the case where an adjustable photographing condition is acquired that is a photographing condition that can be adjusted and the distances acquired by the distance-information acquiring unit satisfy prescribed conditions, the photographing condition is selected by the photographing-condition selecting unit as a photographing condition that is worth adjusting.

Then, the image-processing unit generates an image that will be acquired when the selected photographing condition is set by performing image processing on the image acquired by the image-capturing unit. Thus, the user can be informed that it is possible to acquire an image like the generated image by setting the photographing condition, and the choices available when the user sets the photographing condition the next time a photograph is taken can be extended.

In the above-described aspect, the acquisition-time photographing conditions may be photographing conditions of a lens attached at the acquisition time of the image, and the adjustable photographing condition may be a photographing condition that can be adjusted in the lens attached at the acquisition time of the image.

With this configuration, the user can be informed that it is possible to acquire an image like the generated image by setting a photographing condition while leaving the lens attached at the acquisition time of the image as is and not exchanging the lens, and the choices available when the user sets the photographing condition the next time a photograph is taken can be extended.

In addition, in the above-described aspect, the acquisition-time photographing conditions may be photographing conditions of a lens attached at the acquisition time of the image, and the adjustable photographing condition may be a photographing condition of an exchangeable lens that is different from the lens attached at the acquisition time of the image.

With this configuration, the user can be informed that it is possible to acquire an image like the generated image by setting a photographing condition if the lens attached at the acquisition time of the image is exchanged for another exchangeable lens, and the choices available when the user sets the photographing condition the next time a photograph is taken can be extended.

In addition, in the above-described aspect, the image processing may be electronic blurring processing, and the photographing-condition selecting unit may select, on the basis of the acquisition-time photographing conditions and the adjustable photographing condition, an F-number as a photographing condition that is worth adjusting provided that there is room to adjust the F-number of the lens so as to be small, the distance from the image-capturing unit to the subject is smaller than a first threshold, and the distance from the image-capturing unit to the background is larger than a second threshold, which is larger than the first threshold.

With this configuration, in the case where the distance from the image-capturing unit to the subject is large and the distance from the image-capturing unit to the background is not substantially different from the distance to the subject, a blurring effect would not be sufficiently obtained even if electronic blurring processing were performed, and therefore the F-number is not selected as a photographing condition that is worth adjusting even in the case where there is room to adjust the F-number of the lens so as to be small. In this way, generation and storage of unnecessary images is avoided.

In addition, in the above-described aspect, the image processing may be trimming processing, and the photographing-condition selecting unit may select, on the basis of the acquisition-time photographing conditions and the adjustable photographing condition, a focal length as a photographing condition that is worth adjusting provided that there is room to adjust the focal length of the lens and the distance from the image-capturing unit to the subject is larger than a first threshold.

With this configuration, in the case where the distance from the image-capturing unit to the subject is small, since an effect would not be sufficiently obtained even if trimming processing were performed, the focal length is not selected as a photographing condition that is worth adjusting even if there is room to adjust the focal length. In this way, generation and storage of unnecessary images is avoided.

Furthermore, in the above-described aspect, the image processing may be focus processing, the image-capturing unit may acquire a plurality of images of the subject that are made to have different focus positions from each other, and the photographing-condition selecting unit may select an F-number as a photographing condition that is worth adjusting so that the F-number is large provided that the distance from the image-capturing unit to the subject is smaller than a first threshold and the distance from the image-capturing unit to the background is larger than a second threshold, which is larger than the first threshold.

With this configuration, in the case where the distance from the image-capturing unit to the subject is large and the distance from the image-capturing unit to the background is not substantially different from the distance to the subject, an effect would not be sufficiently obtained even if focus processing were performed, and therefore the F-number is not selected as a photographing condition that is worth adjusting even in the case where there is room to adjust the F-number of the lens so as to be large. In this way, generation and storage of unnecessary images is avoided.

In addition, in the above-described aspect, the image-capturing device may further include a subject-classification determining unit that determines a classification of the main subject extracted by the subject-extracting unit on the basis of the image acquired by the image-capturing unit, and the photographing-condition selecting unit may select a photographing condition that is worth adjusting further provided that the photographing condition is suitable for the classification of the main subject determined by the subject-classification determining unit.

With this configuration, the classification of the main subject is determined by the subject-classification determining unit, and the so determined classification of the main subject serves as a condition for selection of a photographing condition by the photographing-condition selecting unit. Therefore, even in the case where a photographing condition has room for adjustment and the distances between the image-capturing unit, the main subject, and the background satisfy prescribed conditions, if the photographing condition is not suitable for the classification of the main subject, the photographing condition is not selected. In this way, generation and storage of unnecessary images is avoided.

Another aspect of the present invention provides an proposal-image generating device that includes:
- a subject-extracting unit that separates and extracts a main subject and a background from an image acquired by an image-capturing unit;
- a distance-information acquiring unit that calculates a distance between the image-capturing unit and the main subject extracted by the subject-extracting unit and a distance between the image-capturing unit and the background extracted by the subject-extracting unit;
- a photographing-condition acquiring unit that acquires acquisition-time photographing conditions for an acquisition time of the image and an adjustable photographing condition that can be adjusted with respect to the acquisition-time photographing conditions;
- a photographing-condition selecting unit that selects a photographing condition that is worth adjusting on the basis of the acquisition-time photographing conditions and the adjustable photographing condition acquired by the photographing-condition acquiring unit and the distances acquired by the distance-information acquiring unit; and
- an image-processing unit that generates, by performing image processing on the image acquired by the image-capturing unit, an image that will be acquired when the photographing condition selected by the photographing-condition selecting unit is set.

In addition, another aspect of the present invention provides a proposal-image generating method that includes:

- a subject-extracting step of separating and extracting a main subject and a background from an image acquired by an image-capturing unit;
- a distance-information acquiring step of calculating a distance between the image-capturing unit and the main subject extracted in the subject-extracting step and a distance between the image-capturing unit and the background extracted in the subject-extracting step;
- a photographing-condition acquiring step of acquiring acquisition-time photographing conditions for an acquisition time of the image and an adjustable photographing condition that can be adjusted with respect to the acquisition-time photographing conditions;
- a photographing-condition selecting step of selecting a photographing condition that is worth adjusting on the basis of the acquisition-time photographing conditions and the adjustable photographing condition acquired in the photographing-condition acquiring step and the distances acquired in the distance-information acquiring step; and
- an image-processing step of generating, by performing image processing on the image acquired by the image-capturing unit, an image that will be acquired when the photographing condition selected in the photographing-condition selecting step is set.

In addition, another aspect of the present invention provides a proposal-image generating program that causes a computer to execute:
- a subject-extracting step of separating and extracting a main subject and a background from an image acquired by an image-capturing unit;
- a distance-information acquiring step of calculating a distance between the image-capturing unit and the main subject extracted in the subject-extracting step and a distance between the image-capturing unit and the background extracted in the subject-extracting step;
- a photographing-condition acquiring step of acquiring acquisition-time photographing conditions for an acquisition time of the image and an adjustable photographing condition that can be adjusted with respect to the acquisition-time photographing conditions;
- a photographing-condition selecting step of selecting a photographing condition that is worth adjusting on the basis of the acquisition-time photographing conditions and the adjustable photographing condition acquired in the photographing-condition acquiring step and the distances acquired in the distance-information acquiring step; and
- an image-processing step of generating, by performing image processing on the image acquired by the image-capturing unit, an image that will be acquired when the photographing condition selected in the photographing-condition selecting step is set.

In addition, another aspect of the present invention provides a non-temporary computer-readable storage medium that stores a proposal-image generating program that causes a computer to execute:
- a subject-extracting step of separating and extracting a main subject and a background from an image acquired by an image-capturing unit;
- a distance-information acquiring step of calculating a distance between the image-capturing unit and the main subject extracted in the subject-extracting step and a distance between the image-capturing unit and the background extracted in the subject-extracting step; p1 a photographing-condition acquiring step of acquiring acquisition-time photographing conditions for an acquisition time of the image and an adjustable photographing condition that can be adjusted with respect to the acquisition-time photographing conditions;

a photographing-condition selecting step of selecting a photographing condition that is worth adjusting on the basis of the acquisition-time photographing conditions and the adjustable photographing condition acquired in the photographing-condition acquiring step and the distances acquired in the distance-information acquiring step; and an image-processing step of generating, by performing image processing on the image acquired by the image-capturing unit, an image that will be acquired when the photographing condition selected in the photographing-condition selecting step is set.

The present invention affords the advantage that a user can be informed of the range of expression that is available by changing a photographing condition and the choices available when the user sets the photographing condition the next time a photograph is taken can be extended.

REFERENCE SIGNS LIST 1 image-capturing device
2 image-capturing unit
3 proposal-image generating unit (proposal-image generating device)
4 display unit
5 lens
6 image-capturing element
7 lens-information acquiring unit
8 subject-extracting unit
9 distance-information acquiring unit
10 storage unit
11 lens-information reading unit (photographing-condition acquiring unit)
12 determination unit (photographing-condition selecting unit)
13 image-processing unit
14 subject-classification determining unit
S1 image-acquiring step
S2 photographing-condition acquiring step
S3 subject-extracting step
S4 distance-information acquiring step
S5 photographing-condition selecting step
S6 image-processing step
S7 display step

The invention claimed is:

1. An image-capturing device comprising:
an image-capturing unit that acquires an image of a subject;
a subject-extracting unit that separates and extracts a main subject and a background from the image acquired by the image-capturing unit;
a distance-information acquiring unit that calculates a distance between the image-capturing unit and the main subject extracted by the subject-extracting unit and a distance between the image-capturing unit and the background extracted by the subject-extracting unit;
a photographing-condition acquiring unit that acquires acquisition-time photographing conditions for an acquisition time of the image and an adjustable photographing condition that can be adjusted with respect to the acquisition-time photographing conditions;
a photographing-condition selecting unit that selects a photographing condition that is worth adjusting on the basis of the acquisition-time photographing conditions and the adjustable photographing condition acquired by the photographing-condition acquiring unit and the distances acquired by the distance-information acquiring unit; and an image-processing unit that generates, by performing image processing on the image acquired by the image-capturing unit, an image that will be acquired when the photographing condition selected by the photographing-condition selecting unit is set.

2. The image-capturing device according to claim 1, wherein the acquisition-time photographing conditions are photographing conditions of a lens attached at the acquisition time of the image, and
the adjustable photographing condition is a photographing condition that can be adjusted in the lens attached at the acquisition time of the image.

3. The image-capturing device according to claim 1, wherein the acquisition-time photographing conditions are photographing conditions of a lens attached at the acquisition time of the image, and
the adjustable photographing condition is a photographing condition of an exchangeable lens that is different from the lens attached at the acquisition time of the image.

4. The image-capturing device according to claim 1, wherein the image processing is electronic blurring processing, and the photographing-condition selecting unit selects, on the basis of the acquisition-time photographing conditions and the adjustable photographing condition, an F-number as a photographing condition that is worth adjusting provided that there is room to adjust the F-number of the lens so as to be small, the distance from the image-capturing unit to the subject is smaller than a first threshold, and the distance from the image-capturing unit to the background is larger than a second threshold, which is larger than the first threshold.

5. The image-capturing device according to claim 1, wherein the image processing is trimming processing, and
the photographing-condition selecting unit selects, on the basis of the acquisition-time photographing conditions and the adjustable photographing condition, a focal length as a photographing condition that is worth adjusting provided that there is room to adjust the focal length of the lens and the distance from the image-capturing unit to the subject is larger than a first threshold.

6. The image-capturing device according to claim 1, wherein the image processing is focus processing,
the image-capturing unit acquires a plurality of images of the subject that are made to have different focus positions from each other, and
the photographing-condition selecting unit selects an F-number as a photographing condition that is worth adjusting so that the F-number is large provided that the distance from the image-capturing unit to the subject is smaller than a first threshold and the distance from the image-capturing unit to the background is larger than a second threshold, which is larger than the first threshold.

7. The image-capturing device according to claim 1, further comprising: a subject-classification determining unit that determines a classification of the main subject extracted by the subject-extracting unit on the basis of the image acquired by the image-capturing unit;
wherein the photographing-condition selecting unit selects a photographing condition that is worth adjusting further provided that the photographing condition is suitable for the classification of the main subject determined by the subject-classification determining unit.

8. A proposal-image generating device comprising: a subject-extracting unit that separates and extracts a main subject and a background from an image acquired by an image-capturing unit;
   a distance-information acquiring unit that calculates a distance between the image-capturing unit and the main subject extracted by the subject-extracting unit and a distance between the image-capturing unit and the background extracted by the subject-extracting unit;
   a photographing-condition acquiring unit that acquires acquisition-time photographing conditions for an acquisition time of the image and an adjustable photographing condition that can be adjusted with respect to the acquisition-time photographing conditions;
   a photographing-condition selecting unit that selects a photographing condition that is worth adjusting on the basis of the acquisition-time photographing conditions and the adjustable photographing condition acquired by the photographing-condition acquiring unit and the distances acquired by the distance-information acquiring unit; and
   an image-processing unit that generates, by performing image processing on the image acquired by the image-capturing unit, an image that will be acquired when the photographing condition selected by the photographing-condition selecting unit is set.

9. A proposal-image generating method comprising: a subject-extracting step of separating and extracting a main subject and a background from an image acquired by an image-capturing unit;
   a distance-information acquiring step of calculating a distance between the image-capturing unit and the main subject extracted in the subject-extracting step and a distance between the image-capturing unit and the background extracted in the subject-extracting step;
   a photographing-condition acquiring step of acquiring acquisition-time photographing conditions for an acquisition time of the image and an adjustable photographing condition that can be adjusted with respect to the acquisition-time photographing conditions;
   a photographing-condition selecting step of selecting a photographing condition that is worth adjusting on the basis of the acquisition-time photographing conditions and the adjustable photographing condition acquired in the photographing-condition acquiring step and the distances acquired in the distance-information acquiring step; and
   an image-processing step of generating, by performing image processing on the image acquired by the image-capturing unit, an image that will be acquired when the photographing condition selected in the photographing-condition selecting step is set.

10. A non-temporary computer-readable storage medium that stores a proposal-image generating program that causes a computer to execute: a subject-extracting step of separating and extracting a main subject and a background from an image acquired by an image-capturing unit;
   a distance-information acquiring step of calculating a distance between the image-capturing unit and the main subject extracted in the subject-extracting step and a distance between the image-capturing unit and the background extracted in the subject-extracting step;
   a photographing-condition acquiring step of acquiring acquisition-time photographing conditions for an acquisition time of the image and an adjustable photographing condition that can be adjusted with respect to the acquisition-time photographing conditions;
   a photographing-condition selecting step of selecting a photographing condition that is worth adjusting on the basis of the acquisition-time photographing conditions and the adjustable photographing condition acquired in the photographing-condition acquiring step and the distances acquired in the distance-information acquiring step; and
   an image-processing step of generating, by performing image processing on the image acquired by the image-capturing unit, an image that will be acquired when the photographing condition selected in the photographing-condition selecting step is set.

* * * * *